D. COPELAND, Jr.
Cement Sewer-Trap and Molds Therefor.
No. 166,916. Patented Aug. 24, 1875.
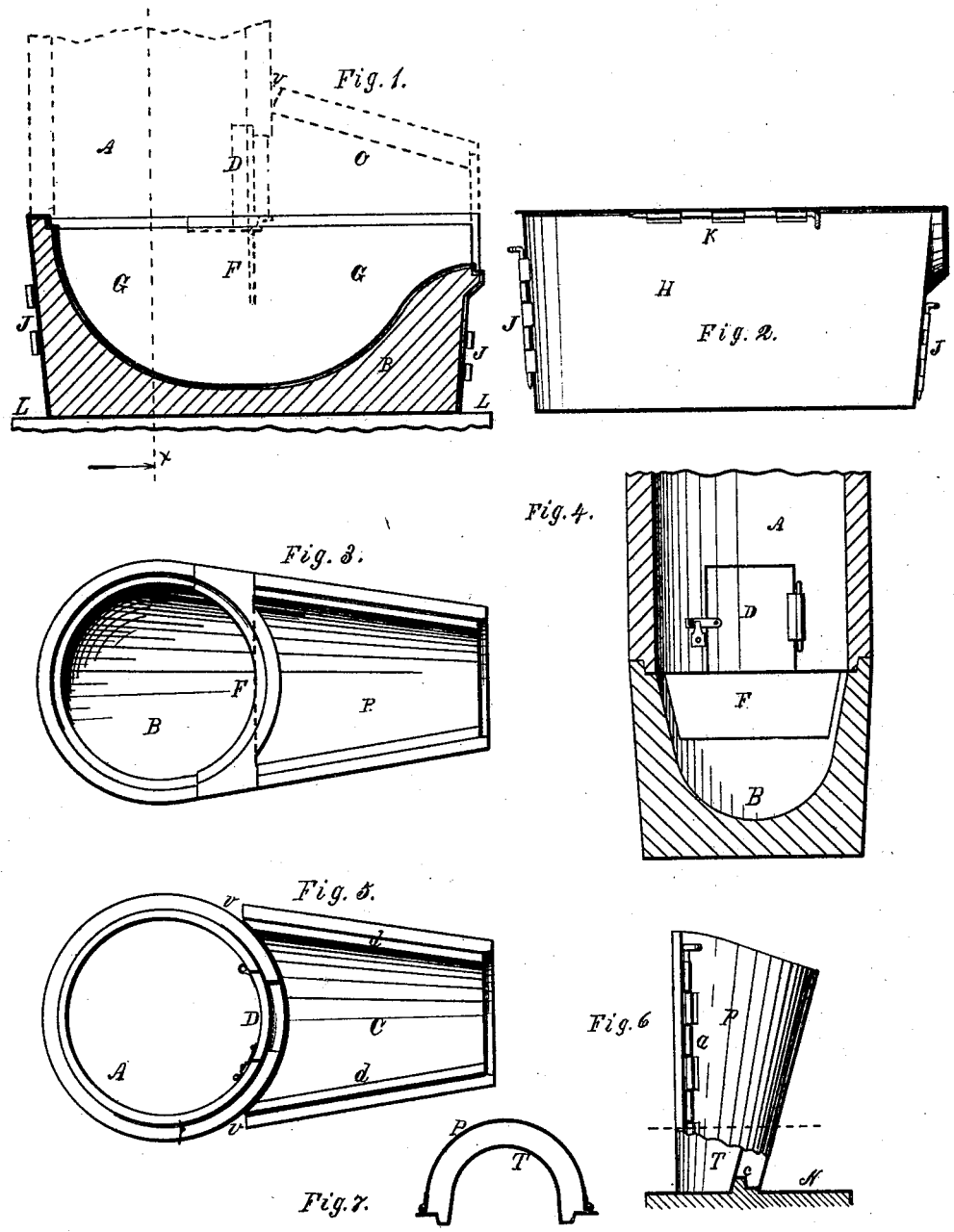

UNITED STATES PATENT OFFICE.

DAVID COPELAND, JR., OF ROCHESTER, NEW YORK.

IMPROVEMENT IN CEMENT SEWER-TRAPS AND MOLDS THEREFOR.

Specification forming part of Letters Patent No. 166,916, dated August 24, 1875; application filed March 22, 1875.

*To all whom it may concern:*

Be it known that I, DAVID COPELAND, Jr., of Rochester, in the county of Monroe and State of New York, have invented new and useful Hydraulic-Cement Sewer-Traps and Molds to form them in; and I do hereby declare that the following is a full, clear, and exact description thereof, reference being had to the accompanying drawings, making part of this specification, in which—

Figure 1 is a vertical central section of the lower or foundation section B of my improved sewer-trap before the case or mold is removed, and representing, by dotted lines, the relative position of the well-hole section A and cap C. Fig. 2 is a side elevation of the mold or flask in which section B is formed. Fig. 3 is a top view of section B finished, with the cut-off or bridge F placed in position. Fig. 4 is a transverse vertical section on the dotted line *x* in Fig. 1, looking in the direction of the arrow. Fig. 5 is an inverted view of the cap C and well-hole section A. Fig. 6 is a side elevation of the mold or flask in which the cap is formed. Fig. 7 is a transverse section of Fig. 6.

Street sewer-traps, when formed of masonry, are very expensive, and cast-iron, being somewhat less so, has been substituted therefor to a limited extent; but this, also, has been found too expensive to admit of its general adoption for this purpose. It is well understood that hydraulic cement would be a very desirable material of which to compose this class of traps, as a matter of economy, it being vastly cheaper than either of the other materials. The great obstacle in the way of using the cement has been, heretofore, the failure to so shape the members necessary to constitute the trap that they might be practically molded of this cement, (which is extremely tender and crumbly when freshly mixed,) and possess sufficient strength to sustain themselves after the removal of the flask, and during the ordinary curing required for this material, and to admit of the necessary handling, transportation, &c.

The object of this invention is to construct and arrange the parts of the trap in such a manner as to render them, when made of this cement, practical articles of manufacture. It consists in forming sewer-traps of only three principal members or sections, composed of hydraulic cement, and of a peculiar internal form or shape, to prevent bursting or injury by frost, and providing flasks or molds in which the members can be readily molded or formed.

The base or foundation section B is formed as shown in Figs. 1, 3, and 4, and is molded in a flask composed of a hollow metallic core, G, and two side plates, H, the latter being connected detachably together centrally at the ends by the hinges, as shown at J, Figs. 1 and 2, or by an ordinary clasp-hook. The core is locked to the sides by a similar fastening, K, Fig. 2. The position of this flask for molding or filling is inverted from that shown in Figs. 1 and 2, and, when filled, a follower, L, is placed upon the open side, or over the exposed portion of the cement, when the filled flask is placed in the position shown. The core G is then unfastened and removed, after which the two sides H may readily be removed, leaving the molded cement in such a form and position as to sustain itself until it shall become properly cured or hardened to bear handling or transportation, which usually requires several months for this kind of cement, being composed only of certain proportions of Rosendale cement or water-lime, gravel, and water.

It is well known that this composition is of a very crumbly and tender nature while green, and is very slow to harden. The cap C I mold in a hollow semicircular conical flask, (shown in Figs. 6 and 7,) and composed of two parts, an inner plate, T, and an outer plate, P. They are detachably connected on each side at the outer edge, as shown at *a*. The inner or concave plate T is provided at the small end with a fillet, *c*, which forms the molded recess *i*, Fig. 5, to receive the end of the pipe leading to the sewer. The ledges *d* are formed by the inner plate T being shaped as shown in Fig. 7. This flask or mold is placed in the position shown in Fig. 6, and filled from the top or large end. The follower-board N, to which the fillet *c* is attached, may be detachable from the flask proper, and, after removing the pintles from the hinge-joints *a*, the plates P and T may be removed, and the molded cap C allowed to stand upon the follower N while hardening. The well-hole section A may be molded in an ordinary flask for making drain-pipe by inserting at the lower end of the flask a filling to form the opening for the door D. This door, which is of iron, may be hinged, as shown in Fig. 4, or otherwise secured in position. The bridge F, Figs. 3 and 4, (also shown in dotted lines in Fig. 1,) is preferably made of metal, and placed in position after the base B is set for use. The well-hole section A is then adjusted in place and the cap C is set, and the joint between it and the section A, which is intentionally left quite open upon the upper or out side, as indicated at $v$, Fig. 5, is then filled with cement, as are also the joints around the bridge F and elsewhere.

It might be desirable to invert the flask with the base B upon a sand-bed, instead of using the follower-board L. The fillet $c$ may be loosely attached to the follower N, and the molded cap also turned upon a sand-bed, to cure or harden sufficiently to bear moving to the yard.

What I claim as my invention is—

1. A street sewer-trap consisting of sections A, B, and C, composed of hydraulic cement, and constructed as shown in Figs. 1, 3, and 4, so as to flare on all sides upward to a line considerably above the overflow, to prevent bursting or injury by frost, as set forth.

2. The flask composed of the sections or sides H and hollow core G, in combination with the follower L, or its equivalent, constructed and arranged to operate conjointly as and for the purpose of molding the hydraulic-cement base B for sewer-traps.

3. The concave semicircular flask composed of the plates P and T and follower N, or its equivalent, constructed as and for the purposes set forth.

D. COPELAND, JR.

Witnesses:
WM. S. LOUGHBOROUGH,
E. B. WHITMORE.